United States Patent
Wong et al.

(10) Patent No.: US 7,557,466 B2
(45) Date of Patent: Jul. 7, 2009

(54) HUMIDITY DETECTION AND POWER CUT-OFF DEVICE

(75) Inventors: Shih-Fang Wong, Taipei Hsien (TW);
Tsung-Jen Chuang, Taipei Hsien (TW);
Wen-Jian Cui, Shenzhen (CN);
Jun-Wei Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 186 days.

(21) Appl. No.: 11/746,650

(22) Filed: May 10, 2007

(65) Prior Publication Data
US 2008/0013241 A1    Jan. 17, 2008

(30) Foreign Application Priority Data
Jul. 14, 2006    (CN)    .................. 2006 1 0061649

(51) Int. Cl.
H01H 45/00    (2006.01)
(52) U.S. Cl. .................................... 307/118
(58) Field of Classification Search ........... 307/118, 307/116
See application file for complete search history.

(56) References Cited

U.S. PATENT DOCUMENTS

| | | | |
|---|---|---|---|
| 5,230,055 A * | 7/1993 | Katz et al. | .................. 713/300 |
| 5,345,184 A | 9/1994 | Andoh | |
| 5,889,466 A * | 3/1999 | Ferguson | ................... 340/602 |
| 6,310,555 B1 | 10/2001 | Stern | |

* cited by examiner

Primary Examiner—Albert W Paladini
Assistant Examiner—Michael Rutland Wallis
(74) Attorney, Agent, or Firm—Frank R. Niranjan

(57) ABSTRACT

A humidity detection and power cut-off device for electronic equipment is provided. The device is connected between a battery (10) and a motherboard (40) of the electronic equipment and includes an auto protection device (20) and a moisture-triggered device (30). The auto protection device is connected between the battery and the power management module and is used to establish or cut off the connection between the battery and the power management module. The moisture-triggered device is used to detect the immediate ambient humidity and controls the auto protection device. If the moisture-triggered circuit detects that the immediate ambient humidity exceeds a predetermined critical humidity value, the moisture-triggered device outputs a trigger signal to the auto protection device. The trigger signal controls the auto protection circuit to cut off a connection between the battery and the power management module, thus to achieve waterproofing protecting for the electronic equipment.

10 Claims, 2 Drawing Sheets

HUMIDITY DETECTION AND POWER CUT-OFF DEVICE

BACKGROUND

1. Technical Field

The present invention relates to power cut-off devices, and particularly to a humidity detection device which can protect an electronic equipment from water or other environmental damages by automatically switching off power supply to a motherboard of the electronic equipment.

2. General Background

Nowadays, many kinds of electronic equipment are broadly used. Electronic equipment are invariable damaged when they come into contact with water and/or are subjected to high humidity environment. Thus protecting electronic equipment from water or humidity is a problem that needs to be overcome. However, as of now, most electronic equipment lack this protection. When these electronic equipment contacts water or are placed in a damp environment, the electrical circuitry within the electronic equipment may short circuit and destroy or damage the electronic equipment.

A Chinese patent application of which the application number is 200410039817 ('817), entitle "New Type Circuit Waterproof Device" discloses a waterproof device for electronic circuits. The waterproof device provided by the Chinese patent '817 has a short circuit protection circuit on the battery. When water enters into the electronic circuit, a water triggering circuit made the battery became short circuit, which causes the short circuit protection circuit to cut off the power supply of the battery. However, to utilize the Chinese patent '817, the short circuit protection circuit should be pre-installed into the batteries. In other words, only batteries that are configured with short circuit protection circuits are applicable.

Therefore, there is a need to provide a device to resolve the problem above.

SUMMARY

A detection humidity and power cut-off device for electronic equipment in accordance with a preferred embodiment of the present invention is provided. The device is connected between a battery and a motherboard of an electronic equipment and includes a moisture-trigger device and an auto protection device. The moisture-trigger device includes a humidity sensor and a comparison circuit. The humidity sensor is used for sensing an immediate ambient humidity and outputting a voltage value corresponding to the immediate ambient humidity; and the comparison circuit is used for comparing the voltage value with a reference voltage that corresponds to a predetermined critical humidity value. The comparison circuit is further used for outputting a trigger signal if the immediate ambient humidity exceeds the predetermined critical humidity value according to the comparison result. The auto protection device includes a switch circuit and a lock circuit, the switch circuit is used for establishing or cutting off a connection between the battery and the motherboard; and the lock circuit is used for receiving the trigger signal and controlling the switch circuit to cut off the connection between the battery and the motherboard.

DETAILED DESCRIPTION OF THE EMBODIMENT

Figure 1:
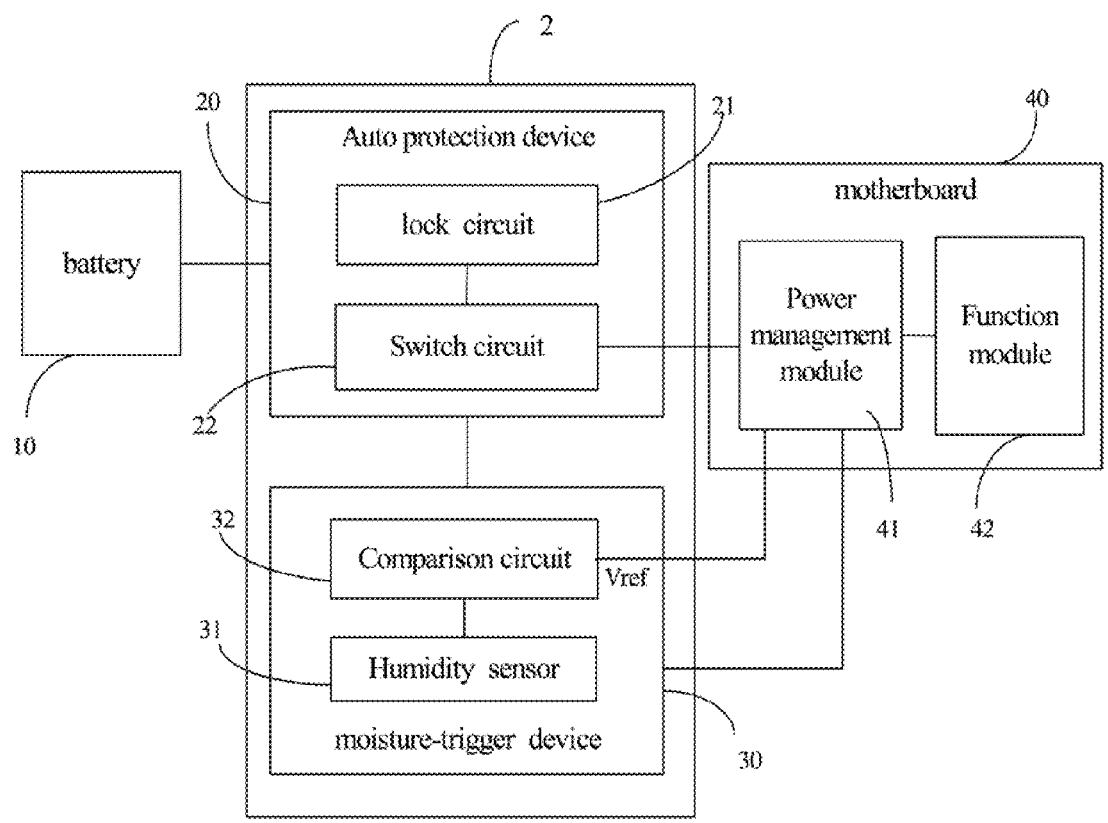
FIG. 1 is a schematic block diagram showing a humidity detection and power cut-off device for electronic equipments in accordance with a preferred embodiment of the present invention.

FIG. 1 is a schematic block diagram showing a humidity detection and power cut-off device for electronic equipment according to a preferred embodiment of the present invention. The humidity detection and power cut-off device 2 is used in an electronic equipment and is connected between a battery 10 and a motherboard 40 of the electronic equipment. The humidity detection and power cut-off device 2 includes an auto protection device 20 and a moisture-triggered device 30. The auto protection device 20 includes a lock circuit 21 and a switch circuit 22. The moisture-triggered device 30 includes a humidity sensor 31 and a comparison circuit 32. The motherboard 40 includes a power management module 41 and at least one function module 42.

The battery 10 is used to supply power to the electronic equipment, and the power management module 41 is used to distribute power from the battery 10 to power consuming units of the motherboard 40, such as the function module 42. In the preferred embodiment, the power management module 41 further distributes power to the moisture-triggered device 30. The function module 42 is used to implement one or more functions of the electronic equipment. The humidity sensor 31 is used to detect an immediate ambient humidity and output a voltage value corresponding to the immediate ambient humidity to the comparison circuit 32. The comparison circuit 32 compares the voltage value with a reference voltage supplied by the power management module 41, the reference voltage representing a predetermined critical humidity value. If the voltage value is less than the reference voltage, in which case the immediate ambient humidity does not exceed the predetermined critical humidity value and is considered suitable for the electronic equipment, the moisture-trigger device 30 does not transmit any trigger signals to the auto protection device 20 and the auto protection device 20 maintains a connection between the battery 10 and the motherboard 40. If the voltage value is higher than the reference voltage, in which case the immediate ambient humidity exceeds the predetermined critical humidity value and is considered unsuitable for the electronic equipment, the moisture-triggered device 30 transmits the trigger signal to the auto protection device 20. The auto protection device 20 reacts to the trigger signal and discontinues the connection between the battery 10 and the motherboard 40. The lock circuit 21 remains a disconnection state between the battery 10 and the motherboard 40 until the battery 10 is removed and then re-attached into the electronic equipment. Therefore, when the electronic equipment is placed in an unsuitable humidity environment, the electronic equipment will quickly power off and be kept in the shutdown state until the battery 10 is removed and then re-attached into the electronic equipment, damages caused by the unsuitable humidity environment is accordingly avoided.

Figure 2:
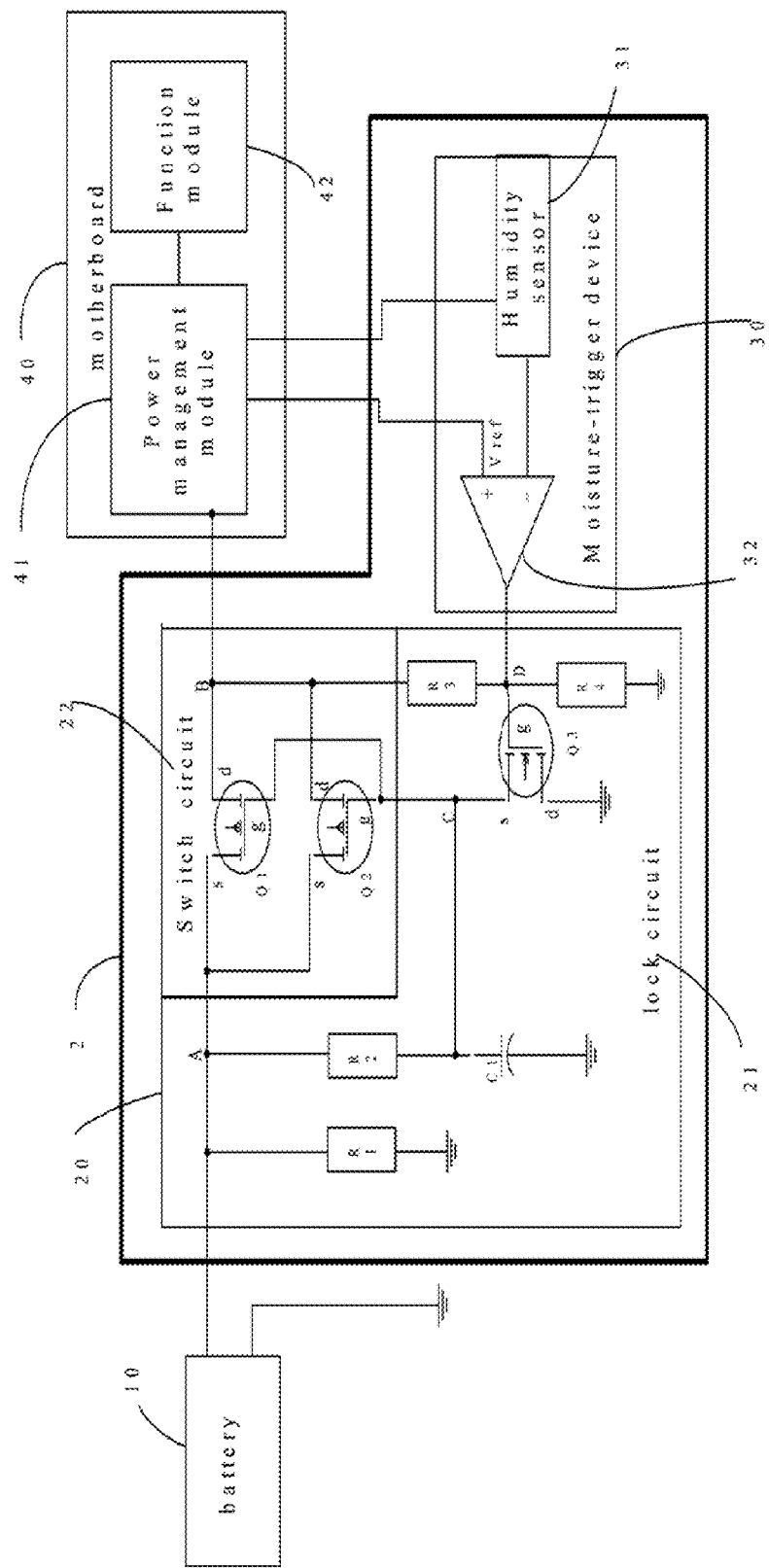
FIG. 2 is a schematic circuit diagram of the humidity detection and power cut-off device of FIG. 1.

FIG. 2 shows a schematic circuit diagram of the humidity detection and power cut-off device. In FIG. 2, an anode of the battery 10 is symbolically expressed as node A, and an input of the power management module is symbolically expressed as node B. A connection point between a resistor R2 and a capacitor C1 which are serially connected between A and ground and constitute a resistance-capacitance circuit is symbolically expressed as node C, and an output of the comparison circuit 32 is symbolically expressed as node D. The switch circuit 22 adopts p-channel enhancement MOSFETs (EMOSFETs) as switching units to establish and break the connection between the battery 10 and the motherboard 40.

In FIG. 2, two P-channel EMOSFETs $Q_1$ and $Q_2$ are employed and connected in parallel. Specifically, sources of the P-channel EMOSFETs $Q_1$ and $Q_2$ are connected together to form a common source, the common source is connected to node A. Drains of the P-channel EMOSFETs $Q_1$ and $Q_2$ are connected together to form a common drain, the common drain is connected to node B. Gates of the P-channel EMOSFETs $Q_1$ and $Q_2$ are connected together to form a common gate of the switch circuit 22, the common gate is connected to node C. The lock circuit 21 includes a discharge resistor R1 connected between node A and ground, the resistance-capacitance circuit, an N-channel EMOSFET $Q_3$ and a voltage dividing circuit. The voltage dividing circuit is constituted by two resistors R3, R4 that are serially connected between node B and ground. The resistors R3, R4 are both connected to node D. The source of the N-channel EMOSFET $Q_3$ is connected to node C, the gate of the N-channel EMOSFET $Q_3$ is connected to node D, and the drain of the N-channel EMOSFET $Q_3$ is grounded.

A non-inverting input of the comparison circuit 32 receives the reference voltage $V_{ref}$ from the power management module 41, and an inverting input of the comparison circuit 32 receives the voltage Value that corresponds to the immediate ambient humidity sensed by the humidity sensor 31. When the electronic equipment is placed in a normal humidity environment and the voltage value is less than the reference voltage $V_{ref}$, the comparison circuit 32 outputs a high voltage level at node D. The high level at node D switches on the N-channel EMOSFET $Q_3$ and keeps the N-channel EMOSFET $Q_3$ at an on state. When the electronic equipment is placed in an unsuitable humidity environment and the voltage value is higher than the reference voltage $V_{ref}$, the comparison circuit 32 outputs a low voltage level. The low voltage level is referred as the trigger signal, and the trigger signal switches off the N-channel EMOSFET $Q_3$.

After the battery 10 is installed into the electronic equipment and starts to supply power, node A is at the high voltage level, and node C is at the low voltage level because the capacitor C1 connects node C to ground. The p-channel EMOSFETs $Q_1$ and $Q_2$ are switched on and output power to the motherboard 40 via node B. Node B is at the high voltage level and accordingly sets node D at a high voltage level via the voltage dividing circuit. The N-channel EMOSFET $Q_3$ is switched on and maintains node C at the low voltage level, causing P-channel EMOSFETs $Q_1$ and $Q_2$ to continue to be turned on. When the immediate ambient humidity environment changes and becomes unsuitable for the electronic equipment, the comparison circuit 32 outputs the trigger signal to switch off the N-channel EMOSFET $Q_3$. The capacitance $C_1$ then begins to accumulate charges and elevates the voltage of node C to a level higher than node A and thus switches off the p-channel EMOSFETs $Q_1$ and $Q_2$. Power supplied to the power management module 41 is disconnected and the electronic equipment is shut down. When the battery 10 is removed from the electronic equipment, the capacitor C1 discharges to ground via the resistors R2 and R1.

In the preferred embodiment of the present embodiment, two parallel connected p-channel EMOSFETs $Q_1$ and $Q_2$ are employed to constitute the switch circuit 22. However, any number of P-channel EMOSFETs will be OK to constitute the switch circuit 22 and the description is not to be construed as limiting the invention to any particular number of P-channel EMOSFETs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A humidity detection and power cut-off device connected between a battery and a motherboard of an electronic equipment, the device comprising:
    a moisture-triggered device, comprising:
    a humidity sensor for sensing an immediate ambient humidity and outputting a voltage value corresponding to the immediate ambient humidity; and
    a comparison circuit for comparing the voltage value with a reference voltage corresponding to a predetermined critical humidity value to determine whether the immediate ambient humidity exceeds the predetermined critical humidity value and outputting a trigger signal if the answer is yes; and
    an auto protection device, comprising:
    a switch circuit for establishing or cutting off a connection between the battery and the motherboard; and
    a lock circuit for receiving the trigger signal, controlling the switch circuit to cut off the connection between the battery and the motherboard, and maintaining a disconnection state between the battery and the motherboard until the battery is removed and then re-attached into the electronic equipment.

2. The device according to claim 1, wherein the moisture-triggered device receives power supply from a power management module of the motherboard.

3. The device according to claim 2, wherein the reference voltage is supplied by the power management module.

4. The device according to claim 1, wherein the switch circuit comprises a P-channel enhancement mode MOSFET (EMOSFET) which has a source connected with the battery, a drain connected with the motherboard and a gate is controlled by the lock circuit.

5. The device according to claim 1, wherein the switch circuit comprises a plurality of parallel connected P-channel enhancement mode MOSFETs (EMOSFETs), sources of the P-channel EMOSFETs are connected together to the battery, drains of the P-channel EMOSFETs are connected together to the motherboard and gates of the P-channel EMOSFETs are controlled by the lock circuit.

6. The device according to claim 1, wherein the lock circuit comprises an N-channel enhancement mode MOSFET (EMOSFET), a resistance-capacitance circuit, a discharge resistor and a voltage dividing circuit.

7. The device according to claim 6, wherein the N-channel EMOSFET comprises a source connected with the switch circuit, a drain grounded and a gate controlled by the output of the comparison circuit, the N-channel EMOSFET responds to the trigger signal and controls the switch circuit to cut off the connection between the battery and the motherboard.

8. The device according to claim 6, wherein the resistance-capacitance circuit comprises a resistor and a capacitor which are serially connected between an anode of the battery (node A) and ground, a connection point between the resistor and the capacitor is connected to the source of the N-channel EMOSFET.

9. The device according to claim 6, wherein the discharge resistor is connected between the anode of battery and ground.

10. The device according to claim 6, wherein the voltage dividing circuit is connected between output of the switch circuit and ground and comprises two resistors connected in series, a connection point of the two resistors is connected to the gate of the N-channel EMOSFET.

* * * * *